(12) United States Patent
Kajander

(10) Patent No.: US 7,932,193 B2
(45) Date of Patent: Apr. 26, 2011

(54) COATED MAT PRODUCTS, LAMINATES AND METHOD

(75) Inventor: Richard Emil Kajander, Toledo, OH (US)

(73) Assignee: Johns Manville, Denver, CO (US)

( * ) Notice: Subject to any disclaimer, the term of this patent is extended or adjusted under 35 U.S.C. 154(b) by 1256 days.

(21) Appl. No.: 10/780,069

(22) Filed: Feb. 17, 2004

(65) Prior Publication Data

US 2005/0181693 A1    Aug. 18, 2005

(51) Int. Cl.
*B32B 3/30* (2006.01)
*B32B 17/10* (2006.01)
*B32B 15/08* (2006.01)

(52) U.S. Cl. ........ 442/180; 442/172; 442/334; 442/415; 442/416; 442/381; 428/196

(58) Field of Classification Search .................. 442/172, 442/180, 334, 415, 416, 381, 318; 428/196
See application file for complete search history.

(56) References Cited

U.S. PATENT DOCUMENTS

| | | |
|---|---|---|
| 3,766,003 A | 10/1973 | Schuller et al. |
| 4,112,174 A | 9/1978 | Hannes et al. |
| 4,129,174 A | 12/1978 | Holleis et al. |
| 4,647,496 A | 3/1987 | Lehnert et al. |
| 4,681,802 A | 7/1987 | Gaa et al. |
| 4,810,476 A | 3/1989 | Gaa et al. |
| 5,112,678 A | 5/1992 | Gay et al. |
| 5,397,631 A | 3/1995 | Green et al. |
| 5,484,653 A | 1/1996 | Kennedy et al. |
| 5,552,187 A | 9/1996 | Green et al. |
| 5,772,846 A | 6/1998 | Jaffee |
| 6,187,697 B1 * | 2/2001 | Jaffee et al. ............. 442/149 |
| 6,723,670 B2 | 4/2004 | Kajander et al. |
| 2003/0134079 A1 | 7/2003 | Bush et al. |
| 2003/0175478 A1 * | 9/2003 | Leclercq ............. 428/105 |

* cited by examiner

*Primary Examiner* — Lynda Salvatore
(74) *Attorney, Agent, or Firm* — Robert D. Touslee

(57) ABSTRACT

Coated fibrous mats having properties particularly suited for a facer on gypsum wallboard, foam and other substrates and in laminates of various types, and the method of making the coated mat is disclosed. The mat contains a major portion of non-cellulosic fibers and a minor portion of cured resinous binder. The exposed surface coating has a smoothness of no more than about 15 microns and is comprised of one or more of a clay, a filler and a polymeric binder. The method comprises at least partially drying the coated mat while the exposed surface of the coating is in contact with a smooth surface.

12 Claims, 4 Drawing Sheets

COATED MAT PRODUCTS, LAMINATES AND METHOD

BACKGROUND

The present invention involves a process of coating fibrous mats to produce a very smooth surface, the resultant coated mats and laminates containing the coated mats. These coated mats have many uses, but are especially useful in producing laminates such as a faced gypsum wallboard and faced foam products.

Fibrous non-woven mats containing fibers such as glass and/or synthetic organic fibers bound together with a resin binder are well known. Usually a solution of urea formaldehyde resin, usually modified with a thermoplastic polymer, or one of many other known resin binders is applied to a non-woven web of fibers and then dried and heated further to cure the urea formaldehyde resin or other resin binder to form a non-woven mat product. The nonwoven webs can be formed dry or from an aqueous dispersion. Typical processes are disclosed in U.S. Pat. Nos. 4,112,174 and 3,766,003, the disclosures of which are hereby incorporated herein by reference.

The fiberglass mat (Johns Manville's 7502 Mat (99 gms/square meter) made using a binder of modified urea formaldehyde resin performed well in the process disclosed in U.S. Pat. No. 4,647,496 to make a faced insulating gypsum board, also disclosed in that patent, but the mat was not as strong as desired which caused process breakouts adding to production costs. This mat was also more rigid than desired which made it difficult to fold around the edges of the board and also irritated the hands and arms of the workers handling and installing the insulating board product. Further, when the faced insulated gypsum board was cut, the dust from the mat was excessive and further irritated those it contacted, particularly if the workers bare arms, etc. were sweaty and exposed to the dust. Skin abrasion and irritation was also a problem for those handling the mat and the faced board when not wearing gloves and long sleeve shirts. The mat also contained "stand-up fibers" which can rub or roll off during manufacture of composite products such as gypsum panels or foam board insulation when it is conveyed or stacked which can cause problems later when the wallboard is painted.

To address the inadequate strength problem a small portion of polyester, polyethylene terephthalate (PET), fibers can be used in place of an equal amount of glass fibers and the urea formaldehyde resin binder was replaced with an acrylic binder containing a small amount of a stearylated melamine. This improved the strength adequately and also improved the handling characteristics of the mat somewhat, i. e. the mat is friendlier to those handling and installing the mat or board, but the acrylic bound mat is more expensive and less fire (flame) resistant and still leaves some glass fibers exposed. Such mats are disclosed in U.S. Pat. No. 5,772,846. While the mats disclosed by this latter reference have substantially improved "hand" and cause very little abrasion or discomfort in handling, the cost is higher, the mat is less flame resistant than the mat disclosed in U.S. Pat. No. 4,647,496 and further improvement is still desired by some users.

A great amount of work has been done to try to eliminate the "stand up fiber" problem including coating the nonwoven fiberglass mats. U.S. Pat. No. 5,112,678 discloses coating compositions aimed at solving this problem containing inorganic compounds such as limestone, clay, quicklime, etc. and up to 5 percent of a polymer binder, but the coating weight was very high at 15-120 pounds per thousand square feet and this coating did not provide all the results desired for some applications such as a facer for gypsum board. This patent does not disclose the method of coating, but instead states "the coating was applied with a coater especially designed for porous glass mats", but does not disclose what the special design was. It does disclose that the coating mixture penetrated entirely through the thickness of the mat which suggests that the compositions disclosed are not exactly coatings, but rather are impregnating compositions that can end up thicker than the mat substrate.

Published U.S. patent application No. 20030134079 discloses a coated fibrous mat for gypsum wallboard reportedly having improved strength versus uncoated mat by controlling the depth of penetration of the coating, but the need for a smoother surface is not addressed.

U.S. Pat. Nos. 5,397,631 and 5,552,187 discloses coating a fiberglass mats after the mats are laminated to a gypsum board. The coating compositions comprise 15-35 percent of a resin binder and 20-65 percent filler comprising inorganic compounds that include limestone and calcined clay. The coating composition is applied to the glass mat with some kind of a roller the coated mat attached to the rigid board is then dried in an infra-red oven to produce a heavy coating weight of 50-100 pounds per thousand square feet. Such coatings have a substantially rougher exposed surface than does the kraft paper facer normally used on gypsum board and this is undesirable.

There still exists a need for nonwoven fiberglass mats that has better flame resistance, lower cost, a smoother surface, good handlability (flexible and non abrasive/non irritating to the skin) and none or far fewer "stand-up fibers". Such are provided in the present invention.

BRIEF SUMMARY OF THE INVENTION

The present invention includes coated fibrous mats having a very smooth surface, smoother than previously coated glass mats for gypsum board and preferably at least as smooth as that of kraft paper facings used on gypsum board. The coated mats of the invention have a coating surface smoothness of an Ra of no more than about 15 microns, preferably less than about 13 microns and most preferably less than about 10 microns. Although not as important, the coated mats of the invention can also have an Ry of less than about 100 microns and preferably less than about 80 microns.

The coated mats of the invention preferably comprise a nonwoven fibrous web bonded together with a binder and coated with a mixture comprising a clay and other ingredients or an inorganic particulate with or without clay as an additional additive, the coating having a very smooth surface and the mat having very few or no "stand up fibers". The coating also preferably contains a polymer binder. Preferably, the coating comprises on a dry basis about 6-15 wt. percent of a polymeric binder, and about 75 to about 94 wt. percent fillers including clay and ground stone. The preferred fillers are a combination of ground limestone and clay with a preferred ratio of clay to limestone being about 15:85. Various solids contents in the coating composition are suitable, but it is preferred to use a solids content of at least about 60 wt. percent. The coating preferably stays mainly on the surface of the nonwoven mat to minimize coating usage and cost. The coating preferably, but not necessarily, contains a binder material like one or more of a conventional polymer binder and can contain other fillers and other binders including inorganic binders like colloidal silica, Portland cement, sodium silicates, etc.

The woven or nonwoven fibrous mats used in the present invention are very permeable due to the many relatively large pores in the surface and throughout the mats as a result of relatively coarse fibers in the mat compared to the size of fibers used in paper. The fibers in the mats used in the invention can have fiber diameters greater than 23 microns and the average fiber diameter can be at least 20 microns, although preferably is less than 20 microns. The Frazier air permeability of these mats is in the range of about 50 to about 1500, preferably in the range of about 175 to about 1000 and more preferably in the range of about 200 to about 800. The fibrous mat substrate can contain some cellulosic fibers, but the major portion of the fibers in the mat are non-cellulosic fibers, including ceramic fibers, synthetic organic fibers, carbon fibers, with the preferred inorganic fiber being glass fibers.

The clay used in the coatings is ground to preferably at least 95 wt. percent minus 200 mesh (U.S. Standard) and more preferably at least 95 wt. percent minus 325 mesh. The fillers used in the coating are preferably at least 95 wt. percent minus 100 mesh and more preferably at least 95 wt. percent minus 200 mesh. Clay is preferred as a coating ingredient because it has inherent thickening capability; otherwise additional synthetic thickeners may be required to optimize the coating. Clay also has an inherent "set" unlike other particulate fillers; in that it will immobilize, in the wet state, on surfaces easier than other slurried fillers, presumably due to the platelet-like structure of many clays.

The method of making and drying a coated fibrous nonwoven mat is also included in the invention. The method comprises coating a fibrous nonwoven mat with an aqueous slurry comprising a polymeric binder and filler comprising applying a layer of the slurry onto the surface of the fibrous nonwoven mat, bringing the wet coating into contact with a smooth surface, which can be, but not necessarily is, hot, while the coating is still wet, holding the coating in contact with the hot, smooth surface while removing enough water from the coating to make the coating self sustaining, and removing the mat and coating from the hot, smooth surface to produce a fibrous nonwoven mat having a coating on at least one surface, the coating having a smooth surface.

An equally useful method is to cast the wet coating onto a steel or other heat-resistant surface such as siliconized paper, nitrile or silicone rubber belting or PET carrier film and post-apply the nonwoven mat to the wet coating, usually by applying a nip roller and drying the composite in place and removing it in a continuous fashion.

The coated mat need not be as dry as needed for use, storage or shipment when it is removed from the hot, smooth surface and in those instances the mat can be further dried in a conventional oven and either cut into desired lengths or wound into rolls as is normal practice with nonwoven mats. It is preferred to use a rotating, heated drum having a very smooth surface, such as a chrome-plated surface, a Teflon surface, or other known polishing surface. Such drums are known in the paper and photographic processing industries. A suitable drum is best known as a Yankee drum, or a dryer can.

The smooth surface used to treat the wet coating need not be on a drum, but instead can be a flat or curved conveyor such as continuous stainless steel Belt Technologies (Agawam, Mass.) conveyor or a Sandvick (Totowa, N.J.) conveyors or other similar heated, smooth belt conveyors. Another advantage of this process is that the coating covers up defects such as small wrinkles, clumps, and small holes that would otherwise cause the mat to be unsuitable as a facing material. Finished coated product will usually assume a surface as smooth or nearly as smooth as the drying surface it is subjected to as it is dried under tension.

The smooth surface need not be a polished surface. The type of surface on a typical stainless steel conveyor belt, on a dryer can, or a Yankee drum, or on a siliconized paper is suitable and any smooth surface that produces the type of surface smoothness on the dry coating as described above for the invention is suitable. It is preferred that the smooth surface on the paper, belt or drum be of a non-corrosive nature with the ingredients in the coating to avoid sticking that would cause problems necessitating that the smooth surface be dressed or replaced.

The present invention also includes laminates comprising the coated mat of the present invention bonded to at least one other layer of material. The at least one other layer can be a paper, a metal foil, a plastic film or layer, a layer of fibrous insulation, a layer of foam, a concrete, a gypsum wallboard or other gypsum containing material, a ceramic, a glass, any kind of wood or wood product like particle board, plywood, oriented strand board, chip board, paper board, cork, perlite board, metal and other materials. The coated mat laminate of the present invention can contain any known adhesive including polymers, copolymers, molten or soft asphaltic and tar materials and other known adhesives between the coated mat layer and the at least one other layer, or the uncoated side of the mat can be bonded directly to the at least one other layer such as to foam, wall board in a known manner by placing a layer of wet foam or foam precursor on the mat and then expanding the foam and by placing the uncoated side of the coated mat onto a layer of wet concrete, cement or gypsum prior these materials taking a hydraulic set so that some of the wet concrete, cement, or gypsum penetrates the uncoated side of the mat and then sets hydraulically to bond the mat to the at least one other layer. These laminates, because of the coated mat of the present invention, have a smoother and superior surface for painting or applying other decorative material like fabric, wallpaper, etc., increased fire resistance, and lower cost than similar laminates made with prior art coated mats.

When the word "about" is used herein it is meant that the amount or condition it modifies can vary some beyond that so long as the advantages of the invention are realized. Practically, there is rarely the time or resources available to very precisely determine the limits of all the parameters of ones invention because to do would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term about as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

DETAILED DESCRIPTION OF THE PREFERRED EMBODIMENTS

Figure 1:
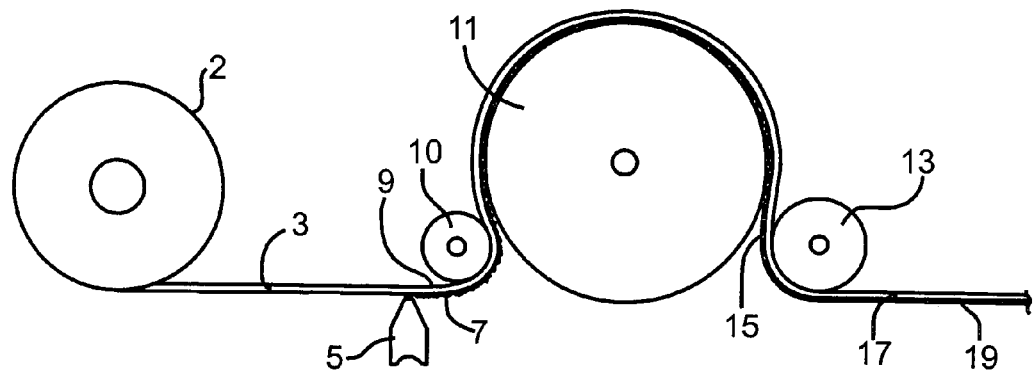
FIG. 1 is a schematic view of a preferred coating process of the present invention.

It is known to make nonwoven mats from glass fibers, and to use these mats as substrates in the manufacture of a large number of roofing and other products. Any known method of making nonwoven mats can be used in this invention, such as the conventional wet laid processes described in U.S. Pat. Nos. 4,129,674, 4,112,174, 4,681,802, 4,810,576, and 5,484,653, the disclosures of each being hereby incorporated herein by reference. The preferred processes for the production of mats of the present invention are those known processes using mat forming machines like a Hydroformer™ manufactured by Voith-Sulzer of Appleton, Wis., or a Deltaformer™ manufactured by North County Engineers of Glens Falls, N.Y. In these machines, the diluted fiber slurry flows horizontally against an inclined moving permeable belt or forming wire (not shown) where the fiber is collected and builds up in a random pattern to form a wet fibrous web while the whitewater passes through the forming wire becoming somewhat foamy (due to contained air) and is transported to a de-airing tank or pit so it can be reused. The wet fibrous web is dewatered to the desired level with a suction box to form a wet fibrous web. This wet nonwoven fibrous web is then normally, but not necessarily, transferred to a second moving screen and run through binder applicator where an aqueous binder mix is applied to the mat in any one of several known ways, such as a curtain coater where the binder slurry is applied in excess to the wet web. Other types of conventional applicators can be used to apply the binder in a known manner. Excess binder slurry is removed by suction to a desired level and the wet, bindered mat is then run through a dryer to remove the water and to cure the resin binder to lock the fibers together. The dry mat is then wound up into rolls. It is also known to make nonwoven mats by a dry process and mats made by dry processes such as dry chopped fiber mats and continuous filament mats that are also suitable for the present invention.

All types of nonwoven mats are suitable for the present invention so long as the openings between the fibers at the surface are sufficiently small. One type of mat that is particularly useful in the present invention is a nonwoven mat made by a known wet laid process containing about 70 to about 90 wt. percent of glass fibers having an average fiber diameter of about 10 to about 23 microns, preferably about 13 to about 18 microns, and about 10 to about 25 wt. percent of a cured conventional mat binder such as a modified acrylic binder, a polyvinyl acetate binder or a modified urea formaldehyde binder holding the fibers together. Such mats are commercial products being available from mat producers, such as 7611, 7502, 8440, 8573 and other fiberglass mats available from Johns Manville of Denver, Colo. For coated mats for gypsum board and the like, it is preferred that the pore size of the substrate mat on the uncoated surface be large enough for the desired degree of penetration of wet gypsum slurry to achieve good bonding of the coated mat to the gypsum board and the like in the use of the mat to make these type of laminates by known processes.

The woven or nonwoven fibrous mats used in the present invention are very permeable due to the many relatively large pores in the surface and throughout the mats. The permeability of these mats is in the range of about 50 to about 1500, preferably in the range of about 175 to about 1000 and more preferably in the range of about 200 to about 800. The nonwoven or woven mats can contain fibers only of glass, fibers only of organic material, mixtures of these fibers, only ceramic fibers, only carbon fibers or mixtures of two or more of these fibers, with or without a minority of cellulosic fibers. The organic fibers can include polyester, nylon, polyethylene, polypropylene, polyvinyl alcohol, polyvinylcholride, and other conventional synthetic or polymer fibers. The ceramic fibers can include alumina fibers, mineral wool fibers, Zirconia fibers, amorphous silica fibers, and aluminosilicate fibers and other ceramic fibers or mixtures thereof. Carbon fibers can also include graphite fibers. The fibers can be of the same diameters or different diameters including fibers having average diameters of less than 2 microns. The nonwoven mats can contain some large diameter fibers of at least 20 microns, or strands of fiber, the strands having much larger average diameters, such as the openings in the mat at the surface to be coated have an average diameter up to 250 microns or more. This coating technique even bridges and hides wrinkles as much as 0.5 inch apart, as much as 0.25 wide or wider and up to at least 150 microns.

FIG. 1 is a schematic of a preferred process according to the present invention. A roll 2 of nonwoven mat is mounted on a pay-off stand and the nonwoven mat 3 is pulled off and past an extrusion coater head 5 where a layer of coating 7 is applied to the bottom surface of the mat 3 as the mat 3 passes by the extrusion coater head 5. The coated mat 9 is then placed on a drum 11 with the coating 7 against the surface of the drum 11. Any suitable means can be used to guide the coated mat 9 onto the drum 11 such as with a turning roller 10. The surface of the drum 11 has a very smooth surface, such as a polished surface or a chrome plated surface or a smooth Teflon surface or other smooth, non-sticking surface. The drum 11 is rotated at the same surface speed as the coated mat 9 is moving so that the coating does not slide along the surface of the drum 11. The drum is heated by any suitable means, as is known, at a temperature that will drive water out of the coating 7 through the mat 3. A suitable drum temperature is a range of about 200 degrees F. to about 450 degrees F. The surface need not be in this temperature range when the coating is first contacted with the smooth surface.

A peel-off roller 13 removes the coated mat 9 from the drum 11 without damaging the coating 15 that, at this point, is either dry or partially dry. The at least partially dry coated mat 17 can then be would up for shipment or run through a dryer to reduce the moisture content of the coated mat 17 to a desired level. The actual moisture content of the at least partially dried coating 15 that is suitable for removal without damaging the coating will vary depending upon the composition of the coating. The exposed surface 19 of the at least partially dry coating 15 is very smooth and uniform.

Figure 2:
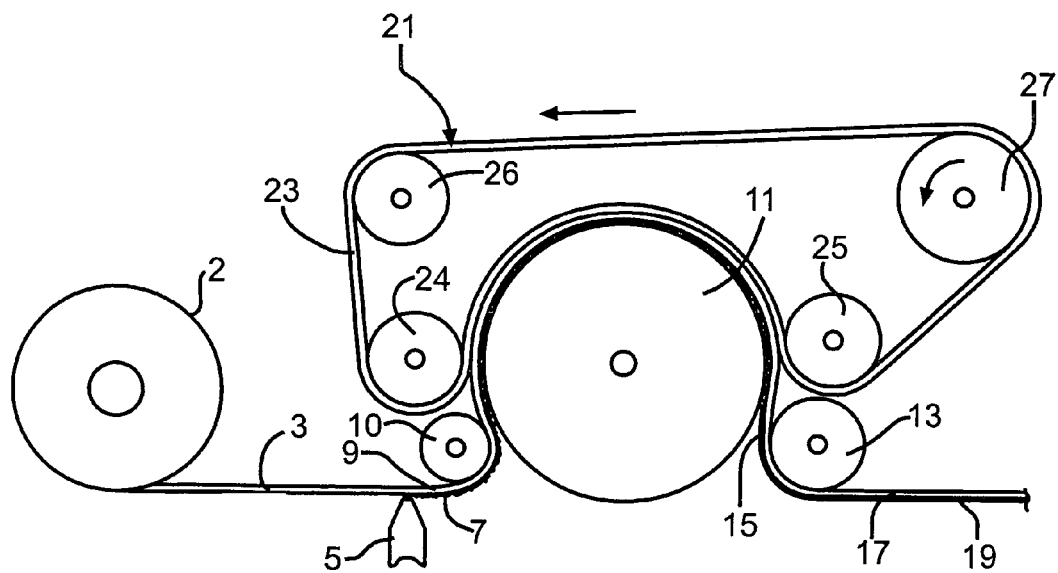
FIG. 2 is a schematic view of a modification of the process shown in FIG. 1 wherein a dryer felt assist apparatus is present.

FIG. 2 is a modification of the process shown in FIG. 1. This modified process permits a faster line speed and helps to insure that the coated mat 9 will not slide or slip on the surface of the drum 11. In this process the coating equipment and procedure is the same as in the process of FIG. 1, but in this process an optional dryer felt assembly 21 has been added. The dryer felt assembly 21 comprises a endless felt or fabric 23 that is guided by rolls 24, 25 and 26 to press against an upper portion of the drum 11 or anything on the drum 11. A fourth driven roll 27 moves the felt 23 in the direction shown at the same speed as the speed of the coated mat 9. The felt or fabric 23 presses the coated mat 9 and the coating 7 against the smooth surface of the drum 11 assisting the coated mat 9 to move at the same speed as the surface of the drum 11.

Figure 3:
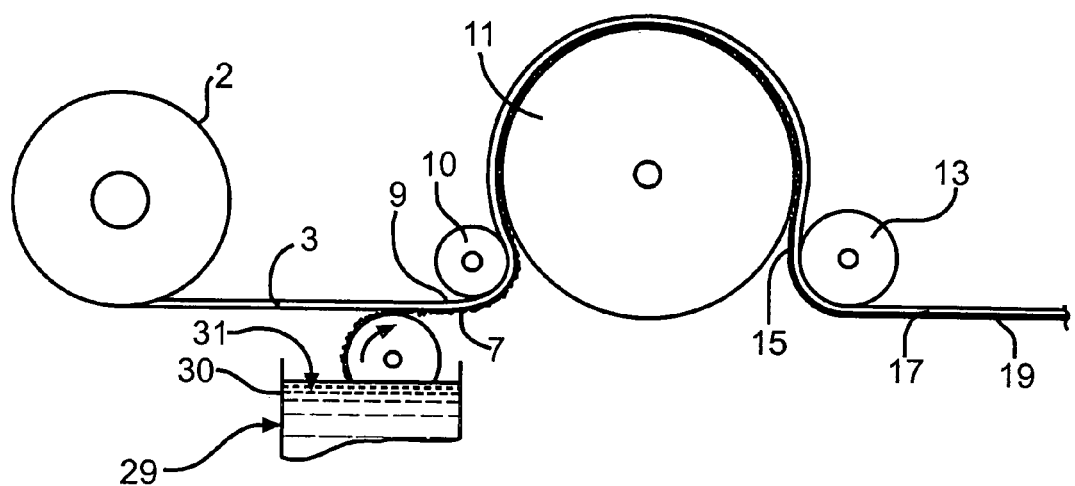
FIG. 3 is a schematic view of a different embodiment of the process shown in FIG. 1 in which a different coating technique is used.
Figure 4:
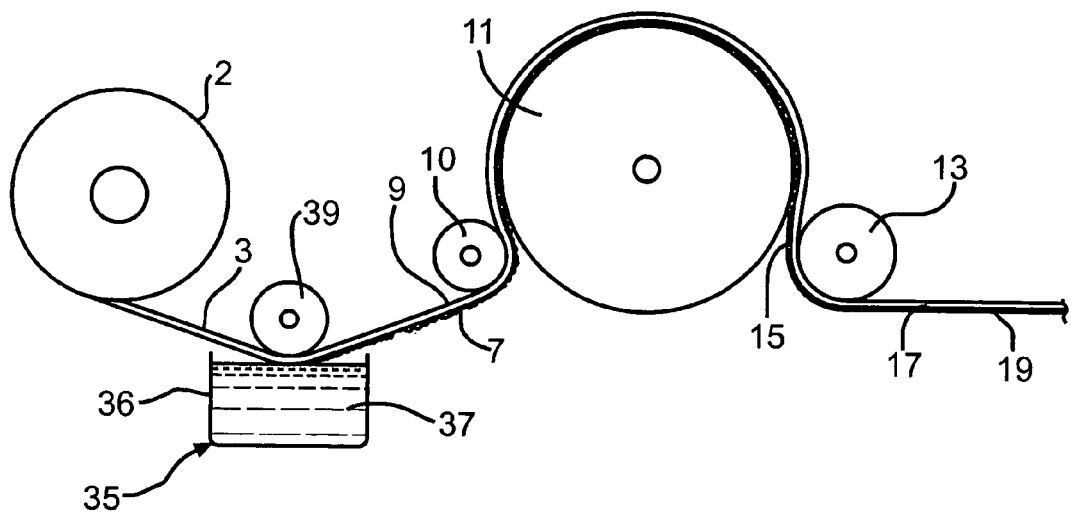
FIG. 4 is a schematic view of a different embodiment of the process shown in FIG. 1 in which a still different coating technique is used.

The extrusion coater or slot coater used in the process of FIG. 1 can be replaced with any number of different coating apparatus and techniques to produce the coated mat products of the present invention. FIG. 3 shows using a roll coater 29 comprising a pan 30 containing the coating slurry 31 and a rotating roll 31. The rotating roll 31 picks up a layer of coating slurry 31 and carries to the bottom surface of the mat 3 where it deposits a layer of coating 7 on the bottom surface of the mat 3. FIG. 4 shows the mat 3 being coated using a kiss coater 35 comprising a open pan 36 containing a controlled level of coating slurry 37. A roll 39 guides the mat 3 in such a way that the bottom surface of the mat 3 just kisses the surface of the coating slurry 37 where a layer 7 of coating adheres to the bottom surface of the mat 3. The level and viscosity of the coating slurry 37 is carefully controlled to produce the desired coating weight in the known manner. The dryer felt assembly 21 shown in FIG. 2 can also be optionally used in the processes shown in FIGS. 3 and 4. A conventional blade, bar or roller (not shown) located just downstream of the location where the bottom of the mat 3 kisses the coating slurry 37 can also be used in the process shown in FIG. 4 to remove any excess coating 7 in a known manner. The coating slurry 37 removed flows back into the pan 36.

Regardless of the type of coating equipment used to apply the coating, it preferably should be applied in an amount to constitute a coating weight in the range of about 4 to about 40 grams per square foot, about 8 to about 88 pounds per 1000 square feet, most preferably about 8 to about 20 grams per square foot, about 17.6 to about 44 pounds per 1000 square feet. Heavier coatings can be applied, but for most applications are not necessary and therefore merely add unnecessary costs.

Regardless of the coating weight and the type of device presenting the smooth surface to the still wet coating, the surface of the drum, conveyor, etc., and the time on the smooth surface is controlled to produce a surface smoothness (Ra) on the exposed surface of coating of no more than about 20 microns microns, and an Ry on the exposed surface of coating of no more than about 90 microns as determined by a Surtronic+3 Surface Texture Analyzer manufactured by Taylor Hobson Ltd of Leicester, England. Ra is defined as the arithmetic mean of the absolute departures of the roughness profile from the mean line of a surface. Ry is a measure of the maximum peak-to-valley height in the roughness of a surface. As an example, heavy-duty kraft paper, as used for facings in gypsum board production may have typical values of 4.8 microns for Ra and 29.1 microns for Ry and are also contain fine wrinkles which would produce an Ry of greater than 100 microns.

It is preferred to use a dryer can heated electrically, or with steam or hot oil with the surface being chrome plated and polished. Instead of the chrome plating, a sleeve of Teflon can be used on the drum. For higher production rates a Yankee drum, heated with steam, is preferred with the surface of the drum being either chrome plated and polished or chemically or plasma or flame spray treated or coated in known ways to provide good release of the dry or partially dry coating.

Figure 5:
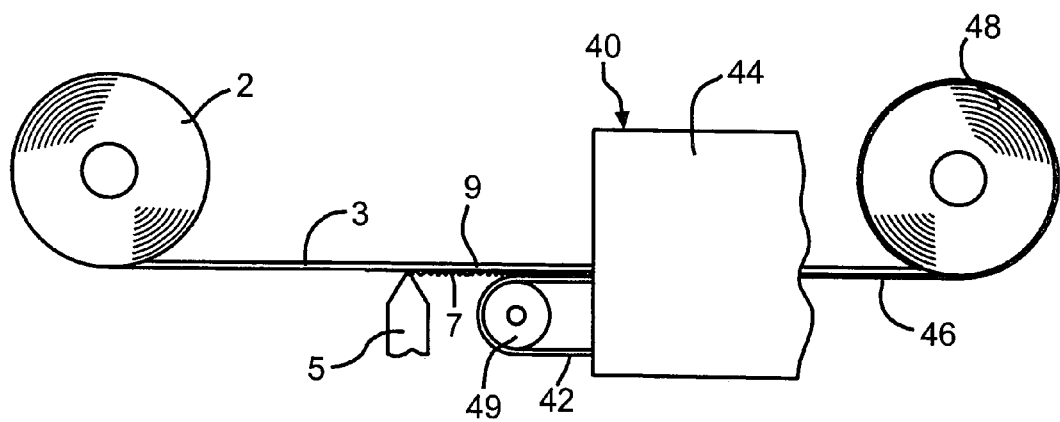
FIG. 5 is a schematic view of a still different embodiment using a generally flat, heated conveyor to at least partially dry the coating on a mat.

It is also suitable to use a generally flat heated conveyor to smooth surface and dry or partially dry the coating on the mat. Examples of heated smooth conveyors that can be used are those made by Belt Technologies of Agawam, Mass. that are used for making PVA films, and the similar heated conveyors of Sandvick® of Stuttgart, Germany. By generally flat it is meant that the heated conveyor could be slightly concave or convex from one end to the other, having an angle preferably of less than 10 degrees from horizontal, but the conveyor should be in the same plane across its width unless it is desired that the mat tend to slightly curve across its width. FIG. 5 shows a process according to the invention in which a flat heated conveyor 40 comprising a smooth metal, normally stainless steel, conveyor 42 with a smooth top surface and an oven 44 for heating the conveyor 42 and for drying the coated mat 9. The dried coated mat 46 can then be wound up in a roll 48 using a conventional mat winder for transport, storage and use.

An alternate procedure is described as a coating application directly to a smooth transfer surface such as a heated steel can or drum or an endless belt of stainless steel or polyester or other high temperature plastic. Immediately or shortly following the application of the coating, a mat is applied via a nip process to the exposed surface of the still-wet coating and the combined mat and coating is dried and then continuously removed from the transfer surface.

Figure 6:
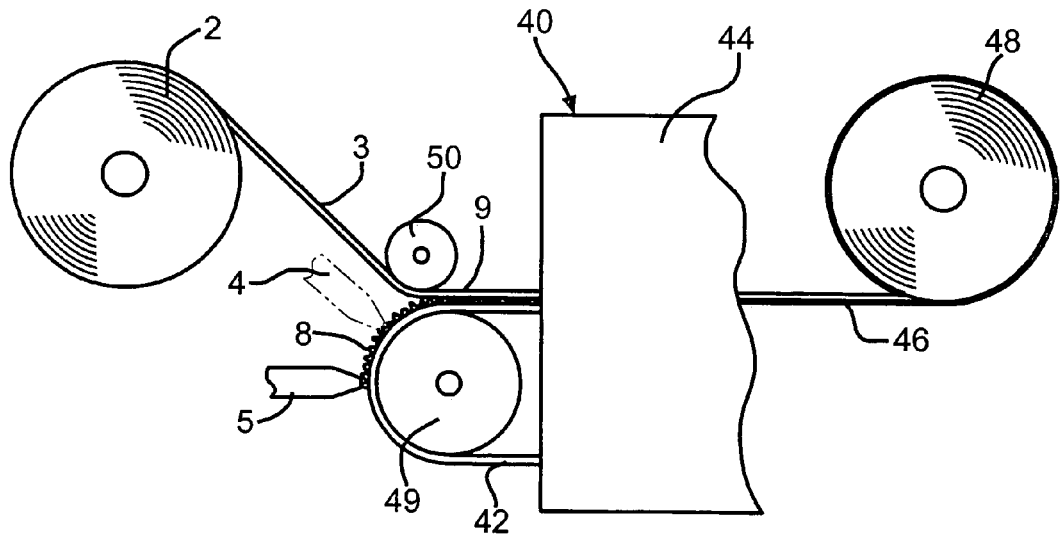
FIG. 6 is a schematic view of a still further embodiment in which the coating is first applied to a smooth belt and then a mat is applied.

FIG. 6 shows another embodiment of the process, an embodiment in which a layer of coating 8 is first applied by the coater 5 to the flat belt 42 having a smooth surface, such as a stainless steel conveyor belt, and then the mat 3 is applied to the wet coating 8 precisely by using a nip roller 50 mounted above the belt 42 and the head roller 49. The coated mat 9 is then carried through the oven 44 by the belt 42 while the coating 8 is laying against the smooth surface of the belt 42 to dry the coating to form the dry coated mat 46 which can be cut to desired lengths in a known manner, or can be wound into rolls 48 as shown for shipment, storage or use. The location of the coater can be varied and the coater 5 is in a preferred location for a belt that is at a temperature no greater than about 150 degrees F. When the belt is hotter, it is preferred to apply the coating closer to the point where the mat 3 is joined with the coating 8, such as shown in phantom with coater 4.

Figure 7:
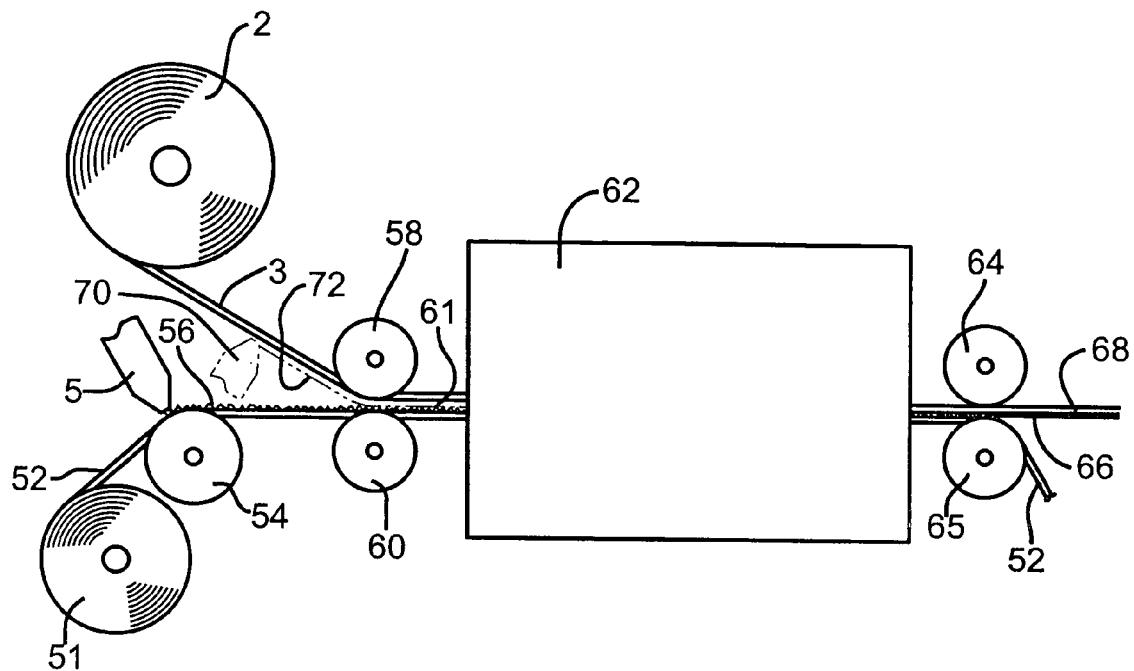
FIG. 7 is a schematic view of a still further embodiment in which the coating is first applied to a smooth carrier material before a mat is applied to the coating.

FIG. 7 shows another embodiment of the invention. In this embodiment a layer 56 of coating material is applied to a carrier sheet 52 pulled from a roll 51, the carrier sheet having a smooth surface, such as a siliconized paper. The layer of coating 56 is applied by a coater 5, preferably located where the carrier sheet 52 is supported, such as with a roller 54. The mat 3 pulled from the roll 2 is applied to the coating layer 56 precisely, preferably using a pair of nip rollers 58, 60 spaced the proper distance apart, to form a wet coated mat 61. The wet coated mat 61 riding with the wet coating on the smooth surface of the carrier sheet 52 is passed through a drying oven 62 where the wet coated mat 61 is dried. The carrier sheet 52 is then pulled away from the dry coating 66 by pulling the carrier sheet 52 partially around a support roller 65 outside the exit end of the dryer 62. An optional roller 64 can be used when it is desirable to also pull the dry coated mat 68 upward away from the carrier sheet 52.

It is also possible to modify this process by applying the wet coating directly to the mat 3 using a coater 70 shown in phantom, the exposed surface of the wet coating 72 being placed in contact with the smooth surface of the carrier sheet 52 at the nip between the nip rollers 58, 60. The rest of the process is the same as described above with respect to FIG. 7.

Figure 8:
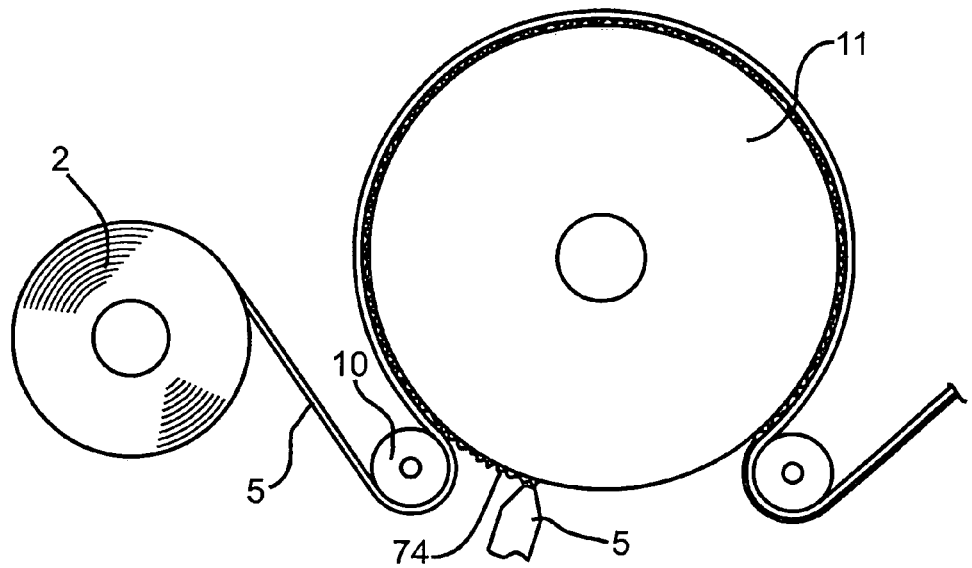
FIG. 8 is a schematic view of another embodiment of the invention in which a wet coating is applied to the smooth surface of a dryer can or drum.

FIG. 8 shows a modification of the process shown in FIG. 1. In this embodiment a layer of wet coating 74 is applied directly to the hot drum 11 with coater 5. The fibrous mat 3 is then applied precisely to the wet coating 74 on the drum 11 with the roller 10. The remainder of the process is the same as that shown in FIG. 1 and described above. This modification is also applicable to the process shown in FIG. 2. Also, a layer of smooth carrier sheet, like siliconized paper, can be on the drum in both the embodiments shown in FIGS. 1-4.

The coatings contain a minor amount of clay, a minor amount of a resin binder and a major amount of filler. The clay is preferably a kaolin or ball clay, but other types of clays having a platelet structure can also be used. The polymeric binder can be one or more polymers or resin binders, preferably those compatible with aqueous systems. Preferred resin binders include polyvinylacetate, acrylic copolymers, modified acrylics, urea formaldehyde modified by plasticizers like one or more of acrylic, polyvinylacetate and similar binder compounds. Most any kind of inorganic filler can be used as well as plastic particles and microspheres. Some examples, but not limited to these, are any oxide, any ground stone, sand, expanded perlite, unexpanded perlite, vermiculite, foliated or unfoliated, particles of polypropylene, nylon, polyethylene, particles of polyvinylchloride, carbon particles, refractory particles, and metal particles. Preferred fillers are ground limestone, precipitated calcium carbonate and hydraulic setting cements. The clays to be used in the coating composition are preferably at least 95 wt. percent minus 200 mesh and more preferably at least 95 wt. percent minus 325 mesh. Particles in the 1-25 micron range perform best.

Water soluble polymeric thickeners such as hydroxyethylcellulose, carboxymethylcellulose or polyacrylamides can be added in small amounts in lieu of, or in conjunction with, the addition of clays. The fillers to be used in the coating composition are preferably at least 95 wt. percent minus 100 mesh, and more preferably at least 95 wt. percent 325 mesh. Generally, the finer the filler, the smoother the finished exposed surface of the coating, however, particle size is more important to how the coating is applied, finer fillers typically used with slot applicators or roll applicators such as gravure and coarser fillers used with knife or wire-wound rod applicators.

Preferably, the coating comprises on a dry basis about 5-15 wt. percent of a polymeric binder, about 10 to about 50 wt. percent clay and about 75 to about 85 wt. percent fillers. A preferred combination is ground limestone and clay with a preferred ratio of clay to limestone being about 15:85 to about 50:50 and about 7 wt. percent of a polymeric binder in an aqueous slurry. Various solids contents in the coating composition are suitable, but it is preferred to use a solids content of at least about 60 wt. percent with the highest solids content consistent with good handling, good shelf life and good coating formation preferred. The coating can contain other fillers, binders, deflocculants, and dispersing aids including inorganic binders like colloidal silica, Portland cement, sodium silicates, and color pigments, biocides, anti-fungal agents etc. To minimize coating costs, it is preferable that the coating remains mainly on the surface of the mat substrate.

The task of preparing a slurry having high solids content and good shelf life and coating formation properties is similar to preparing slurries for slip casting and glazing of ceramics and the techniques use there are useful in the present invention. The coating slurries are preferably prepared by putting the proper amount of water for a batch into a mixer like a blunger or tank with a Lightning® mixer. The water is preferably a de-ionized water, but tap water or well water can be use. De-ionized water produces more consistent rheology and viscosity in the slurry as is well known. The proper amount of deflocculant(s) and dispersing aids are then added to the water followed by the clay. When the clay is thoroughly dispersed, the other filler(s) are then added at a slow rate until the desired solids content has been achieved. It may be necessary to adjust the pH by during the addition of the fillers to prevent unnecessary and excessive viscosity increases and/or conglomeration.

Example 1

An 8514 glass mat from Johns Manville weighing 6.4 grams/sq. ft, comprised of ¾ inch long, 13-micron diameter E glass fibers, bonded with 20% acrylic copolymer resin is coated with a 93% calcium carbonate/7% acrylic copolymer latex resin blend at 74% solids concentration. The carbonate was Imerys #10 White and the acrylic was Noveon Hycar™ 26391. The coating was applied directly to the mat surface and this was dried in a circulating hot air oven with the surface exposed to air in the normal prior art manner. The dry coating weight was 19.9 grams/sq. ft., yielding a coated composite with an Ra of 16 microns and an Ry of 116 microns.

Example 2

A fiberglass mat, 8514 mat from Johns Manville, weighing 6.4 grams/sq. ft, comprised of 13-micron diameter, ¾ inch long, E glass fibers, bonded with 20% acrylic copolymer cured resin is coated with a an aqueous composition of 93 wt. percent of calcium carbonate and 7 wt. percent of an acrylic copolymer latex resin, based on the dry weight, and enough water to produce a 74 wt. percent solids concentration. The coating was applied to a smooth steel surface, dry mat nipped onto the coating and the composite subsequently dried on the smooth steel surface. The carbonate was Imery's #10 White and the acrylic copolymer latex resin was Noveon Hycar 26391. The dry coating weight was 19.3 grams/sq. ft., and a coated surface smoothness of an Ra of 1.2 microns and an Ry of 84 microns.

Example 3

The same procedure as example 1 above was used, but a thicker coating having a dry coating weight of 29.8 grams/sq. ft. was applied, yielding an Ra of 1.2 microns and an Ry of 18.4 microns on the surface of the dry coated mat.

Example 4

A glass mat, 8440 from Johns Manville, weighing 3.2 grams/sq. ft., comprised of 1 long, 16-micron diameter E glass fibers, bonded with 16% acrylic copolymer cured resin is coated with a an aqueous composition of 93 weight percent calcium carbonate and 7 wt. percent of an acrylic copolymer latex resin blend, based on the dried solids, and enough water to produce a 74% solids concentration. The carbonate was Imery's #10 White and the acrylic was Noveon Hycar 26391. The dry coating weight was 21.6 grams/sq. ft. and had a coating surface smoothness of an Ra of 1.9 microns and an Ry of 28.9 microns.

Example 5

A glass mat, JM's 8514, weighing 6.4 grams/sq ft, comprised of ¾ inch long, 13-micron diameter E glass fibers, bonded with 20% acrylic copolymer resin is coated with a 62% calcium carbonate/31% clay/7% acrylic copolymer latex resin blend at 74% solids concentration. The coating was applied to a polyester film carrier and the mat nipped onto the coating and the composite subsequently dried. The carbonate was Imery's #10 White, the clay was Imery's Hydrite™ RS and the acrylic was Noveon Hycar 26391. The dry coating weight was 18.1 grams/sq. ft., yielding a coated mat surface smoothness of an Ra of 6.8 microns and an Ry of 72 microns.

Example 6

The same procedure as described in example 5 above was used, but the coating thickness was adjusted in a known manner to produce a dry coating weight of 35.9 grams/sq. ft., yielding a dry coated mat with a coating surface smoothness of an Ra of 3.0 microns and an Ry of 71 microns.

Example 7

A glass mat weighing 7.7 grams/sq. ft., comprised of 70 wt. percent ½ inch long, 10-micron diameter E glass fibers, 5 wt. percent of 5-micron avg. diameter finer glass fibers and bonded with 25 wt. percent cured acrylic copolymer resin was coated. This mat contained fine, shallow about ¼ inch wide wrinkles. The coating composition was 63 wt. percent Imery's Kaopaque™ 10S clay, 30 wt. percent Imery's Glomax™ LL clay and 7 wt. percent acrylic copolymer latex resin blend and containing enough water to produce a 61 wt. percent solids concentration. The acrylic copolymer latex was Noveon Hycar™ 26391. The coating was applied directly to the mat surface and this was dried in an impingement hot air2-zone Megtec oven, with the exposed surface of the coating exposed to air and without the benefit of drying against a smooth surface. The dry coating weight was 17 grams/sq. ft., yielding a coated mat with the exposed surface of the coating having a surface smoothness of an Ra of 18.2 microns and an Ry of 117 microns. The wrinkles in the substrate mat showed through the coating.

Example 8

A glass mat as described in Example 7 above was coated with a 20 wt. percent Imery's Kaopaque™ 10S clay, 13 wt. percent Imery's Glomax™ LL clay, 60 wt. percent Hydro-Carb™ 60 calcium carbonate, and 7 wt. percent acrylic copolymer latex resin blend in enough water to produce a 61 wt. percent solids concentration. The acrylic copolymer latex resin was Noveon Hycar™ 26391. The coating was applied to a siliconized paper and the mat was laid onto the exposed surface of the wet coating using a nip roller, as shown in the drawings, prior to drying in the same commercial oven used in Example 7 above. After drying in the oven, siliconized paper was pulled away from the coating on the mat. The dry coating weight was 13.5 grams/sq. ft., and the exposed surface of the coating on the coated mat had a surface smoothness of Ra of 1.08 and an Ry of 17.4. The wrinkles in the mat substrate did not show through the coating, but could be seen on the backside, uncoated side, of the fiberglass mat.

The Ra and Ry values of the coated mats made in Examples 1 and 7 versus that of the coated mats made in the other Examples show the substantial difference in surface smoothness when the wet coating is placed on a smooth surface and at least partially dried while in contact with the smooth surface. The coated fibrous mats of the present invention have an exposed surface on the coating that is substantially smoother than heretofore produced with such inexpensive coatings on fibrous mats having a Frazier permeability of greater than about 50 and especially higher than about 175. Another feature of covering wrinkles and other discontinuities in the fibrous mats is a further advance. The coatings tend to have no peaks, only valleys, in the surface roughness. The peaks have been entirely or almost entirely eliminated by the surface drying techniques described, so the presented surface looks extremely smooth to the naked eye.

The coating prevents shedding of fibers from the face that is exposed after laminating to intermediate products or used to face products like gypsum board, insulation boards or blankets. It also presents a friendly surface by holding "stand up fibers" down, reducing abrasion or irritation caused by frequent handling of current glass mat faced products, particularly in hot, humid conditions. Further, this inventive method can also be used to coat the surface of a mat with a coating containing fire retardant, intumescent, heat activating adhesive or other adhesive, colored pigments and other functional materials by incorporating the functional ingredient(s) in the coating composition, further reducing the manufacturing cost.

The coated mats can be bonded to another nonwoven or woven mat or to fabric, paper, metal foil, plastic film, foam, gypsum wallboard, insulating boards, ceramic substrates, or other substrates of various types and combustible substrates, like a wood product such as hardboard, particle board, chip board, oriented strand board or plywood in known processes. With foam and gypsum board, the wet foam precursor or gypsum slurry can be formed against the uncoated surface of the coated mat to bond to the fibrous web and to produce the laminate boards. In the case of combustible substrates the coated mat can be adhered with any known adhesive or fire resistant adhesive with the uncoated web of the mat against the combustible layer in known ways.

While the preferred embodiments of the invention have been disclosed in detail, other embodiments within the described invention including those having other functional additives, known or obvious to those skilled in the art, in the coatings are considered to be part of the present invention and are intended to be included in the scope of the invention claimed below.

The invention claimed is:

1. A laminate comprising a first layer bonded to a second layer comprising a fibrous mat containing a major portion of non-cellulosic fibers having an average fiber diameter of at least about 10 microns and up to 20 microns, the fibrous mat having a coating on a surface, the coating amounting to about 8 to about 20 grams per square foot, the coating having an exposed surface having a surface smoothness Ra of no greater than about 13 microns, the coating comprising a filler comprising a minor amount of clay, a minor amount of polymeric binder and a major amount of inorganic filler, at least 95 wt. percent of the particles of clay and inorganic filler having a particle size of less than 200 mesh.

2. The laminate of claim 1 wherein the coating comprises about 10 to about 20 wt. percent clay, about 5 to about 15 wt. percent polymeric binder and about 65 to about 85 wt. percent filler.

3. The laminate of claim 2 wherein the coating comprises kaolin clay and limestone, both having a particle size of at least 95 wt. percent minus 325 mesh.

4. The laminate of claim 3 wherein kaolin is present in an amount of about 12 to about 18 wt. percent and limestone is present in an amount of about 70 to about 80 wt. percent and the kaolin particles are in the range of 1-25 microns.

5. The laminate of claim 2 wherein the fibrous mat is a nonwoven mat comprising glass fibers and a cured polymeric binder bonding the fibers together.

6. The laminate of claim 3 wherein the glass fibers have an average diameter of at least about 11 microns.

7. The laminate of claim 2 wherein the exposed surface of the dry coating has an Ra of no greater than about 10 microns.

8. The laminate of claim 1 wherein the exposed surface of the dry coating has an Ra of no greater than about 10 microns.

9. The laminate of claim 1 wherein the first layer is selected from the group consisting of paper, metal foil, plastic, fibrous insulation, foam, concrete, gypsum wallboard, a gypsum containing material, ceramic, glass, metal, perlite board, wood and a wood product.

10. The laminate of claim 3 wherein the first layer is selected from the group consisting of paper, metal foil, plastic, fibrous insulation, foam, concrete, gypsum wallboard, a gypsum containing material, ceramic, glass, metal, perlite board, wood and a wood product.

11. The laminate of claim 2 wherein the first layer is selected from the group consisting of paper, metal foil, plastic, fibrous insulation, foam, concrete, gypsum wallboard, a gypsum containing material, ceramic, glass, metal, perlite board, wood and a wood product.

12. The laminate of claim 4 wherein the first layer is selected from the group consisting of paper, metal foil, plastic, fibrous insulation, foam, concrete, gypsum wallboard, a gypsum containing material, ceramic, glass, metal, perlite board, wood and a wood product.

* * * * *